Feb. 22, 1949.   E. H. PARNELL, SR   2,462,828
BAIT CASTING AND TROLLING LURE
Filed Sept. 7, 1945
Fig. 1.
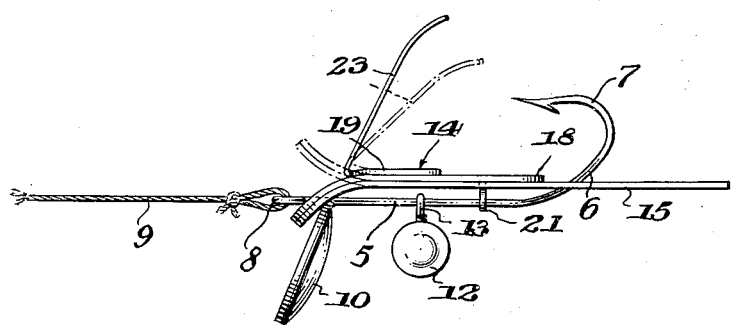
Fig. 2.
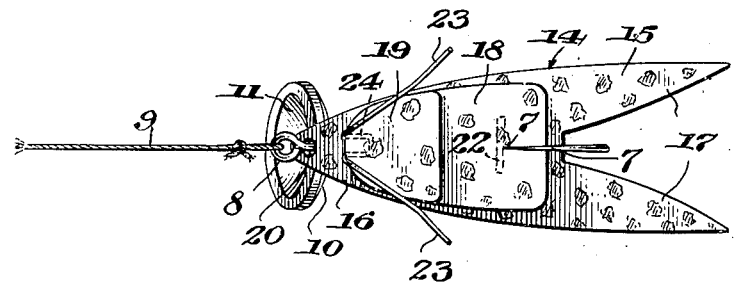
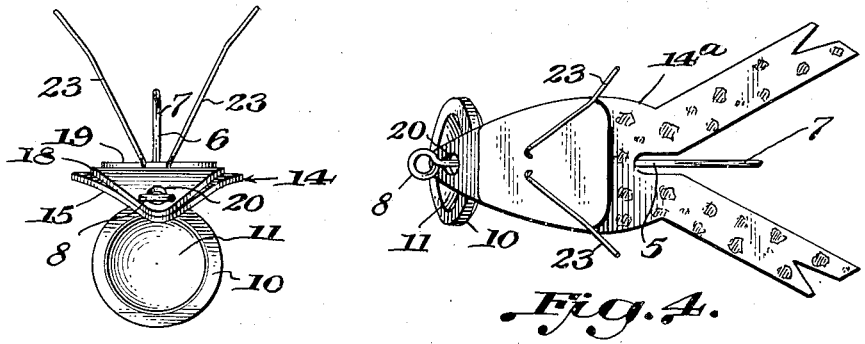
Fig.3.   Fig.4.
Inventor,
E. H. Parnell, Sr.
By [signature] atty.

Patented Feb. 22, 1949

2,462,828

UNITED STATES PATENT OFFICE 2,462,828

BAIT CASTING AND TROLLING LURE

Edwin H. Parnell, Sr., Greenville, S. C.

Application September 7, 1945, Serial No. 614,835

8 Claims. (Cl. 43—38)

My invention relates to a bait casting and trolling lure.

An important object of the invention is to provide a device of the above mentioned character so constructed that the bait simulating member may be readily applied to and removed from the body portion provided with the hook, thereby permitting of the use of any number of bait simulating members, of different shapes, sizes or color.

A further object of the invention is to provide a device of the above mentioned character which will have a swimming motion when being trolled, simulating live bait.

A further object of the invention is to provide a sliding and swinging weight to automatically adjust the lure for ready action before falling into the water.

A further object of the invention is to provide a resilient guard for the hook which is mounted upon the flexible bait simulating member, thus preventing the hook from engaging objectionable objects, to a considerable extent, and tending to jerk free from such objects, when engaging the same.

Other objects and advantages of the invention will be apparent during the course of the following description.

In the accompanying drawings forming a part of this application and in which like numerals are employed to designate like parts throughout the same, Figure 1 is a side elevation of a bait casting and trolling lure embodying my invention, Figure 2 is a plan view of the same, Figure 3 is an end elevation of the same, and Figure 4 is a plan view of the device, showing a bait simulating member of different shape and color.

In the drawings, wherein for the purpose of illustration are shown a preferred embodiment of my invention, the numeral 5 designates a shank provided at its rear end with an upwardly extending portion 6, carrying a hook element 7, which faces forwardly. The shank 5 is provided at its forward end with an eye 8, for connection with a line 9. The shank 5, upwardly extending portion 6 and hook element 7 constitute a hook which in turn constitutes the rigid body portion of the lure. Arranged rearwardly of and near the eye 8 is a rigid cup-shaped disc 10, rigidly attached to the shank 6, and extending downwardly below the shank and inclined forwardly toward its bottom. The hook 5 is above the shank 6, while the disc 10 is below this shank. This cup-shaped disc has its concave face 11 arranged forwardly. The cup-shaped disc 11 causes the lure to wiggle with a right-left wobble, simulating the natural life-like motion of live bait through the water, such as that of a fly, bug, fish, frog or the like. The disc 11 also simulates the head or bill of a live bait.

Disposed at the rear of the disc 10 is a weight, in the form of a metal ball 12, having a loop 13 rigidly secured thereto and this loop is slidable upon the shank 6, to turn thereon and move longitudinally thereof.

The numeral 14 designates a live bait simulating member, which is flexible and resilient and may be formed of suitable material, such as rubber, flexible plastics, or the like. This member comprises a lower sheet 15 which may be cut into a shape representing generally the shape of a fly. The forward portion 16 of the sheet 15 constitutes the body of the fly and the rear portions 17 the wings. A second sheet 18 is arranged upon the sheet 15 and cemented or otherwise securely attached thereto and a third sheet 19 is arranged upon the sheet 18 and cemented or otherwise securely attached thereto. The sheet 18 extends to the forward end of the sheet 15 and these sheets are provided near their forward ends with an opening 20. A loop 21 is arranged near the rear end of the sheet 18, to receive the shank 6, and this loop is disposed beneath the sheet 15 and is carried by transverse arm or arms 22, arranged between the sheets 15 and 18 and securely attached to the sheets by the cement. The loop 21 may be attached to the sheet 15 by any suitable means. The arm or arms 22 extend transversely of the sheet 14 and therefore do not impair the transverse flexibility of the bait simulating member 14.

Arranged above the sheet 15 and near its forward end are upwardly extending rearwardly inclined resilient guards 23, preferably formed of spring steel. These guards are arranged in advance of the hook 5 and project above the same and also diverge rearwardly so that they are positioned upon opposite sides of the hook 5. The guards 23 are preferably formed from a single strand of wire, bent to provide a U-shaped intermediate portion 24, arranged between the sheets 19 and 18, and securely attached thereto by the cement. Any other suitable means may be employed to attach the resilient guards to the flexible sheet or sheets. Attention is called to the fact that these resilient guards are mounted upon the flexible bait simulating member.

To apply the bait simulating member to the shank 6, the member 14 may be held in the left hand, with the guards 23 projecting upwardly and the disc 10 held in the right hand, and the hook 5 presented to the loop 21 and the point 7 passed through the loop in a rearward direction toward the wings 17. The hook 5 is threaded into the loop and a portion of the shank 6 enters the loop, and the hook at first faces downwardly, but is then turned or inverted so that the hook 5 faces upwardly and assumes a position above the member 14, Figure 1. The hook passes through the space between the wings. This brings the loop 8 adjacent to the opening 20. The opening 20 is slightly smaller than the loop 8 and this loop may now be passed through the opening 20, due to the elasticity of the member 14. The assembled elements will now assume their relative positions, as shown in Figure 1. The line 9 is now secured to the eye 8. The bait simulating member 14 may be of a light color, such as tan or cream, with yellow spots. In Figure 4, a bait simulating member 14a is provided, which is substantially identical with the member 14, except that it is shaped to simulate a frog. This member 14a may be black or of a dark color, with light spots, such as yellow. The bait simulating member 14a is flexible and is formed of the same material as described in connection with the member 14. The bait simulating member may be formed in any desired shape, and may have any desired color or colors. It is thus seen that I have provided a device wherein a change may be made from one bait simulating member to another, providing different color or colors, in order to find out just what color object the fish will take. As is well known, fish may strike one color object when the water is clear, but when the water is muddy, they will strike another color object, or the difference in light due to a bright sky or a cloudy sky makes a considerable difference in the color object which the fish will strike.

During trolling, the lure swims beneath the water, and is held beneath the water by the cup-shaped disc 11, which produces the wiggling or wobbling motion, while maintaining the device in the upright position. The guards 23 project above the hook 5 and prevent the hook from being caught in objects, such as weeds or the like, to a considerable extent. Since these guards are resilient and are mounted upon the flexible body 14, a jerking action is produced if the hook engages an object, such as a weed, tending to free the hook. The weight 12, which is capable of sliding and swinging, automatically adjusts the lure for ready action, before falling into the water. The forward end of the member 14 is disposed in advance of the disc 10 and engages therewith. The disc 10 serves as a stop to limit the rearward movement of the body 14 with respect to the shank 6, which would be caused by the rearward pressure of the water upon the body 14 during trolling. Further, the disc 10 holds the body 14 against turning movement, to any considerable extent, upon its longitudinal axis, with relation to the shank 6.

It is to be understood that the forms of my invention herewith shown and described are to be taken as preferred examples of the same and that various changes in the shape, size and arrangement of parts may be resorted to without departing from the spirit of my invention or the scope of the subjoined claims.

Having thus described my invention, what I claim is:

1. A bait casting and trolling lure, comprising a shank provided at its forward end with line attaching means and having an upwardly extending hook element near its rear end, a downwardly extending disc rigidly attached to the shank forwardly of the hook element, a flexible bait simulating member arranged above the shank and having an opening near its forward end to receive the forward end of the shank, the forward end of the member being arranged forwardly of the disc and engaging therewith, the disc holding the member against rearward longitudinal movement upon the shank and preventing it from turning upon its longitudinal axis to any considerable extent with relation to the shank, a loop arranged beneath the member and secured to the member at a point spaced from the forward opening, said loop removably receiving the shank and hook, and inclined resilient guards arranged in advance of the hook and mounted upon the flexible member.

2. A bait casting and trolling lure, comprising a shank and provided near its forward end with line attaching means and having a hook element near its rear end, a disc mounted upon the shank and extending laterally thereof, a flexible bait simulating member provided near its forward end with an opening, such forward end being flexed laterally so that the forward end of the shank is passed through said opening, the forward flexed end of said member being arranged between said shank and disc and held against movement by the disc, and a loop secured to the flexible member and removably receiving the shank and hook.

3. A bait casting and trolling lure, comprising a shank provided near its forward end with line attaching means and provided near its rear end with a hook element, a disc attached to the shank forwardly of the hook, the disc extending downwardly and the hook element upwardly in use, a flexible bait simulating member to extend longitudinally of the shank above the disc and having an opening near its forward end, such forward end being flexed laterally so that the opening receives the forward end of the shank and such flexed forward end is held between the shank and disc, and a loop carried by the flexible member and arranged rearwardly of said opening and disc and removably receiving the shank and hook element and adapted to be removed from the hook element while the loop remains secured to the flexible member.

4. A bait casting and trolling lure, comprising a shank provided near its rear end with a hook element and having an axially extending loop near its forward end, a disc rigidly attached to the shank rearwardly of the loop, the disc extending downwardly and the hook element upwardly in use, a flexible bait simulating member having an opening near its forward end, such forward end being flexed laterally so that the opening receives the forward end of the shank and such flexed forward end is held between the loop and disc, a loop permanently secured to the flexible member and spaced rearwardly from the forward end of such member, the last named loop being arranged beneath the member when in use and adapted to removably receive the shank and hook element, and a weight having a loop slidably mounted upon the shank and arranged between the disc and the loop carried by the flexible member.

5. A bait casting and trolling lure, comprising a substantially rigid longitudinal body portion provided at its forward end with a loop which extends axially of the body portion, a disc secured to the body portion and extending laterally therefrom and arranged near and rearwardly of the loop, an elastic flexible bait simulating member provided near its forward end with an opening which is smaller than the loop, the opening being stretched over the loop and the forward end being bent laterally and brought into engagement with the disc, a loop secured to the bait simulating member rearwardly of the opening of the member for receiving the rear portion of the body portion, the rearward pull of the bait simulating member causing the forward flexed end of the same to engage the disc and a hook element associated with the body portion.

6. A bait casting and trolling lure, comprising a substantially rigid longitudinal body portion provided at its forward end with a loop which extends axially of said body portion, a disc secured to the body portion and depending laterally therefrom and arranged near and rearwardly of the loop, an elastic flexible bait simulating member arranged above the longitudinal body portion and provided near its forward end with an opening which is smaller than the loop, the opening being stretched over the loop and the forward end being flexed laterally downwardly and into engagement with the disc, and a hook associated with the body portion.

7. A bait casting and trolling lure, comprising a substantially rigid longitudinal body portion having forward and rear ends, the body portion being provided at its forward end with a line attaching means, a hook element carried by the rear end of the body portion, a disc secured to the body portion near its forward end and extending laterally therefrom, a flexible bait simulating member arranged upon one side of the body portion and extending longitudinally thereof and provided near its forward end with an opening, the forward end being laterally flexed so that the opening may receive the forward end of the body portion, said member having an opening rearwardly of the disc for receiving the hook element, the flexed end of the member being arranged in advance of the disc and brought into engagement therewith by the rearward pull upon said member, the disc holding the member against turning movement upon its longitudinal axis with respect to the body portion, and a hook associated with the body portion.

8. A bait casting and trolling lure, comprising a substantially rigid longitudinal body portion provided near its forward end with line attaching means, a disc secured to the body portion near its forward end and extending laterally therefrom, an upwardly directed extension carried by the rear end of the body portion, and a flexible bait simulating member disposed upon one side of the body portion and extending longitudinally thereof and provided near its forward end with an opening, the forward end of the flexible member being laterally flexed so that the opening receives the forward end of the body portion, a loop secured to said member rearwardly of the disc for receiving the upwardly directed extension, and a hook associated with the body portion.

EDWIN H. PARNELL, Sr.

REFERENCES CITED

The following references are of record in the file of this patent:

UNITED STATES PATENTS

| Number | Name | Date |
| --- | --- | --- |
| 1,250,473 | Ladd | Dec. 18, 1917 |
| 1,992,766 | Pflueger | Feb. 26, 1935 |
| 2,003,366 | Jordan | June 4, 1935 |
| 2,036,954 | Murray | Apr. 7, 1936 |
| 2,231,507 | Richards | Feb. 11, 1941 |